United States Patent
Weissman et al.

[11] Patent Number: 6,029,623
[45] Date of Patent: *Feb. 29, 2000

[54] NO$_X$ REDUCTANT GENERATION IN A COMPRESSION-IGNITION ENGINE BY HYDROCARBON INJECTION DURING THE EXPANSION STROKE

[75] Inventors: Walter Weissman, Berkeley Heights; Frank Hershkowitz, Liberty Corner; Anthony Marion Dean, Hampton; Harry Stuard Pink, Whitehouse Station, all of N.J.

[73] Assignee: Exxon Research and Engineering Co., Florham Park, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/988,417

[22] Filed: Dec. 10, 1997

[51] Int. Cl.$^7$ .................................................. F02B 3/00
[52] U.S. Cl. ........................ 123/299; 123/304; 123/575
[58] Field of Search .................... 123/299, 575, 123/304, 27 R

[56] References Cited

U.S. PATENT DOCUMENTS

| | | |
|---|---|---|
| 4,217,871 | 8/1980 | Ohashi et al. . |
| 4,414,940 | 11/1983 | Loyd . |
| 4,416,229 | 11/1983 | Wood . |
| 4,481,921 | 11/1984 | Tsuhahara et al. . |
| 4,543,930 | 10/1985 | Baker . |
| 5,119,780 | 6/1992 | Ariga . |
| 5,245,953 | 9/1993 | Shimada et al. ........................ 123/575 |
| 5,479,775 | 1/1996 | Kraemer et al. . |
| 5,609,131 | 3/1997 | Gray, Jr. et al. ........................ 123/299 |
| 5,727,519 | 3/1998 | Kawamura ............................. 123/299 |
| 5,740,775 | 4/1998 | Suzuki et al. ........................... 123/299 |
| 5,787,708 | 8/1998 | Lane et al. ................................ 60/301 |
| 5,816,228 | 10/1998 | McCandless ............................ 123/575 |

FOREIGN PATENT DOCUMENTS

| | | |
|---|---|---|
| 0767303 | 4/1997 | European Pat. Off. . |
| 2736094 | 6/1995 | France . |
| 9603571 | 2/1996 | WIPO . |

OTHER PUBLICATIONS

M. Dürnholz, et al., 6 Aachener Kolloquium Fahrzeng–und Motorentechnik '97, PP661.

*Primary Examiner*—John Kwon
*Attorney, Agent, or Firm*—Paul E. Purwin

[57] ABSTRACT

The invention relates to a method for producing NO$_x$ reductants by injecting hydrocarbon into a diesel engine's combustion chamber during the expansion cycle. The secondary injected hydrocarbon is formed, under appropriate conditions, into oxygenates and olefins that are suitable for reducing NO$_x$ species in the presence of conventional exhaust catalysts. The appropriate injection timing is obtained by referring to a calibration obtained by direct engine measurements.

8 Claims, 6 Drawing Sheets

6,029,623

$NO_x$ REDUCTANT GENERATION IN A COMPRESSION-IGNITION ENGINE BY HYDROCARBON INJECTION DURING THE EXPANSION STROKE

FIELD OF THE INVENTION

The present invention relates generally to an improved method for operating a diesel engine. More particularly, the invention relates to a method for forming $NO_x$ reducing species in a diesel engine from hydrocarbons injected during the expansion stroke.

BACKGROUND OF THE INVENTION

In the normal operation of a diesel engine atmospheric air is first compressed in the combustion chamber of the engine to a pressure of about 500 PSI. Compression of the air raises its temperature to about 1,000° F. Diesel fuiel is then injected to the compressed hot air through a fuel injection nozzle. The fuel is atomized in the combustion chamber where it rises to its auto ignition temperature, resulting in the spontaneous ignition, burning, and expansion of the gases in the chamber. The expansion of the combustion products drives the cylinder downwardly thereby providing the power stroke of the engine.

In order for a diesel engine to operate efficiently, i.e., with minimum fuel consumption at maximum power, it typically is operated under air to fuel ratios which produce exhaust gases that contain large amounts of oxygen and usually only minimal amounts of unburned hydrocarbons. Unfortunately, operating a diesel engine for maximum power and efficiency also results in conditions that raise the peak operating temperatures and therefore $NO_x$ emissions. One method for lowering the $NO_x$ emissions is, of course, to bring the exhaust gas into contact with a catalyst capable of reducing the $NO_x$ species in the gas stream. However, for catalysts known to be effective in the diesel exhaust environment, catalytic de-$NO_x$ is usually more effective when reducing species are present in the exhaust gas. In order to generate these species in the engine one normally has to operate at conditions of low peak temperature which are conditions that are directly opposed to what is desired from the standpoint of overall efficient engine operation.

One method for providing reducing species at the catalyst is secondary injection, wherein a hydrocarbon is injected into a diesel engine's cylinder at a fixed crank angle ner the end of the expansion stroke. One problem associated with this method is that the quantity of various reductant molecules required for complete reduction of the $NO_x$ species depends upon engine operating parameters such as engine speed, engine load, and inlet gas (air and exhaust gas recirculation, "EGR") pressure when a compressor is present, and secondary injection at a fixed crank angle makes no provision for adjusting the quantity of injected hydrocarbon in response to changes in engine operating parameters. A second problem associated with secondary injection at a fixed crank angle is that the most effective reductants, i.e. olefins and oxygenates, are not the engine's primary fuel source. A secondary source of these compounds must be provided for the engine for injection of these compounds into the exhaust stream. Still another problem associated with secondary injection at a fixed crank angle is the introduction of high boiling point aromatic molecules into the exhaust. This places an extra burden on the exhaust treatment system because such molecules will contribute to PNA emissions unless they are oxidized to $CO_2$ and $H_2O$.

Accordingly, it is an object of the present invention to provide an approach to operating a diesel engine so as to produce effective $NO_x$ reducing species in a diesel engine's combustion chamber in quantities sufficient for catalytically converting the $NO_x$ present in the engine's exhaust gas. It is further an object of the invention to convert $NO_x$ in the exhaust gas in a way that avoids the constraints normally imposed if these species are to be formed as by-products of normal combustion.

Stated differently, it is an object of the present invention to operate a diesel engine efficiently while generating sufficient organic cracked products, i.e. reducing species, in the combustion chamber for the catalytic reduction of $NO_x$ in the exhaust gas.

SUMMARY OF THE INVENTION

In one embodiment, the invention relates to a method for diminishing $NO_x$ emissions by increasing the formation of oxygenates, unsaturates, unsaturated oxygenates, and mixtures thereof from a hydrocarbon injected into a diesel fueled engine's cylinder during an expansion stroke without substantially reducing the engine's power, the method comprising:

(a) determining at one or more preselected engine operating points a calibration amount of a hydrocarbon and a calibration crank angle value at which an increased amount of oxygenates, unsaturates, unsaturated oxygenates, and mixtures thereof are formed in the engine's cyclinder, at which a dimished $NO_x$ concentration is present in the engine's exhaust stream downstream of an exhaust catalyst, and at which the engine's power is not substantially reduced;

and then during engine operation, (b) measuring the engine's operating point;

(c) determining a crank angle value and a hydrocarbon amount for injection during the expansion stroke at the measured operating point from the calibration crank angle values and calibration hydrocarbon amounts at the preselected operating points when the measured operating point is the same as one of the preselected operating points and, when the measured operating point is different from the preselected operating points, determining the hydrocarbon amount and crank angle for injection during the expansion stroke by interpolating between the calibration crank angle values and the calibration hydrocarbon amounts at the preselected operating points;

(d) injecting the amount of hydrocarbon into the engine's cylinder during the expansion stroke at the crank angle value; and (e) repeating steps (c) and (d) whenever the operating point in step (b) changes.

DETAILED DESCRIPTION

Figure 1:
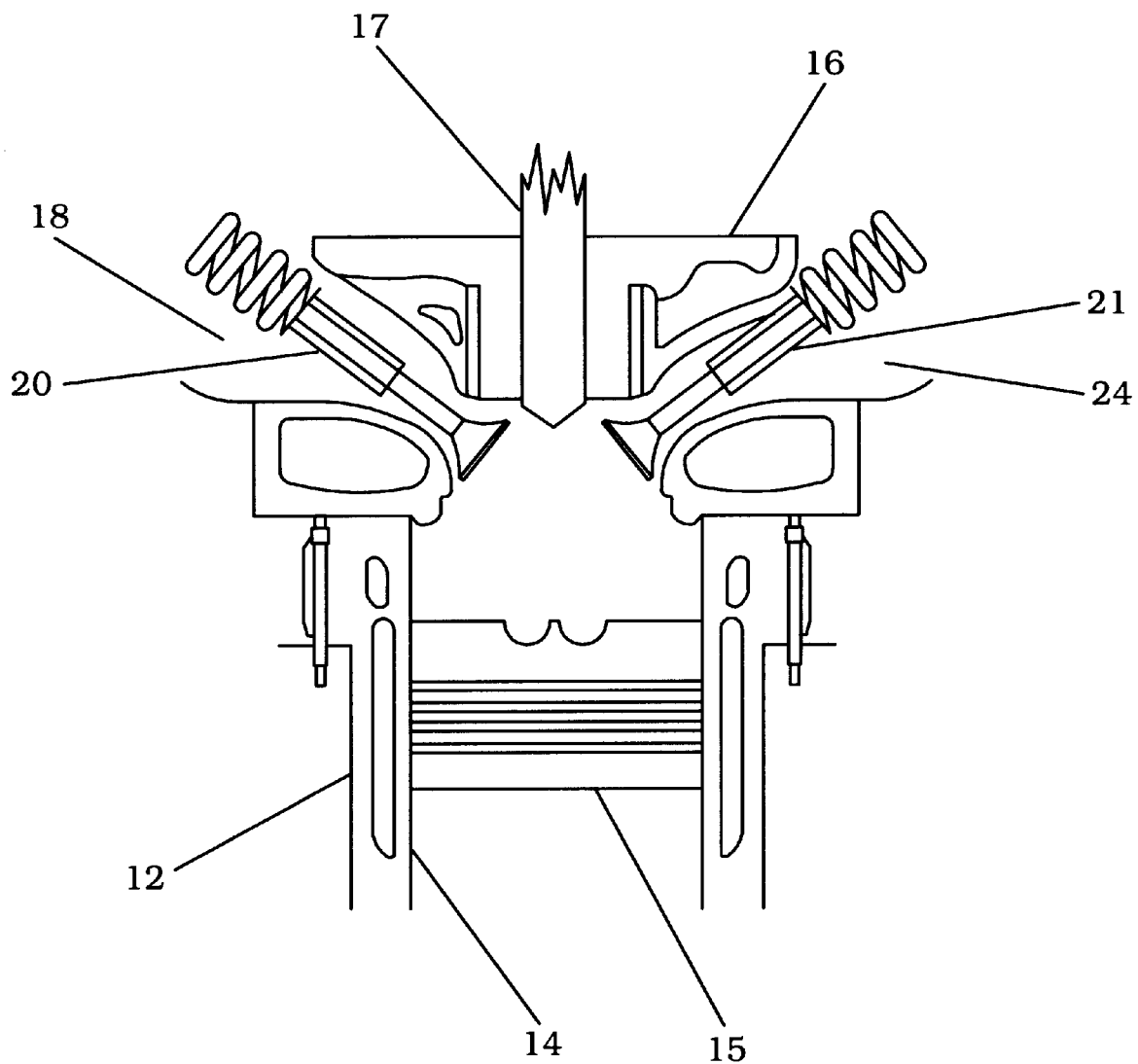
FIG. 1 is a schematic illustration of the principle components of one cylinder of a diesel engine necessary to understand the present invention.

The invention will now be described in greater detail with specific reference to a reciprocating four-stroke compression ignition internal combustion engine; however, it should be readily appreciated that the invention is equally applicable to other compression ignition engines such as two-stroke reciprocating compression internal combustion engines. Also, in the description which follows like reference numerals in the drawings apply to like parts.

Referring first to FIG. 1, a diesel engine includes an engine block 12 in which there is a combustion chamber or cylinder 14. Inside the cylinder 14 is a slideable piston 15 attached to the engine's crank (not shown). On top of cylinder 14 is a cylinder head 16 closing one end of the cylinder 14.

A fuel injection nozzle 17 is mounted in the cylinder head 16 for timed injection of diesel fuel directly into the combustion chamber or cylinder 14. The engine also includes an exhaust valve 21, exhaust port 24, an air valve 20 and air port 18.

In operation, when the piston 15 is at a position corresponding to a crank rotation angle of about 0° at the beginning of the cylinder's intake stroke, intake valve 20 opens and atmospheric air is drawn into the combustion chamber or cylinder 14 as the piston moves downwardly. Valve 20 closes at or soon after the conclusion of the intake stroke, and the piston 15 rises on the compression stroke. The piston 15 begins its compression stroke at a position near the bottom of the cylinder corresponding to a crank rotation angle of 180°, i.e. the bottom dead center position. An optional pilot fuel charge is injected into the combustion chamber when the piston 15 reaches a position corresponding to a crank rotation angle of about 330° on the compression stroke. The air in the cylinder is compressed increasing its temperature and pressure causing any pilot fuel charge to undergo a pre-flame chemical and physical reaction. As the compression continues, the primary diesel fuel is injected into the cylinder 14 via injection nozzle 17, and when the diesel fuel ignites it causes the entire mixture in the combustion chamber 14 to expand. The expansion (or power) stroke of the engine begins as the piston passes a position corresponding to a top dead center (0°) crank angle. In accordance with the present invention during the expansion of the cylinder 14 on the power stroke, a pre-selected amount of hydrocarbon fuel based on the amount of primary fuel is injected into the cylinder at a pre-determined rotation angle called the secondary injection angle. This pre-selected fuel injection may be injected via nozzle 17 or by a separate nozzle.

Hydrocarbon injection during expansion, i.e. the power stroke, is referred to as secondary injection in order to distinguish it from primary fuel injection. The hydrocarbon injected during expansion is the secondary injected hydrocarbon. Generally, the hydrocarbon fuel injected during the expansion stroke may be the same as the primary fuel injected into the engine during the compression stroke or it may be some other hydrocarbon or oxygenate. The optimum amount of secondary injected hydrocarbon at any particular operating point is determined by the ratio of reductants to $NO_x$ compounds needed at the exhaust catalyst for effective $NO_x$ conversion. This ratio may depend upon a number of factors including the engine operating temperature, the time of injection, the compression ratio, the engine rpm, air-fuel ratio, engine load, exhaust gas recycle (egr), and the desired composition of the effluent gas stream. In general, however, about 0.5 to about 5 wt. %, preferably about 1 wt. % to 3 wt. %, based on the weight of the primary fuel utilized for the main combustion will be injected into the cylinder.

It should be noted that secondary injection in accordance with this invention does not substantially reduce the engine's power.

Figure 3:
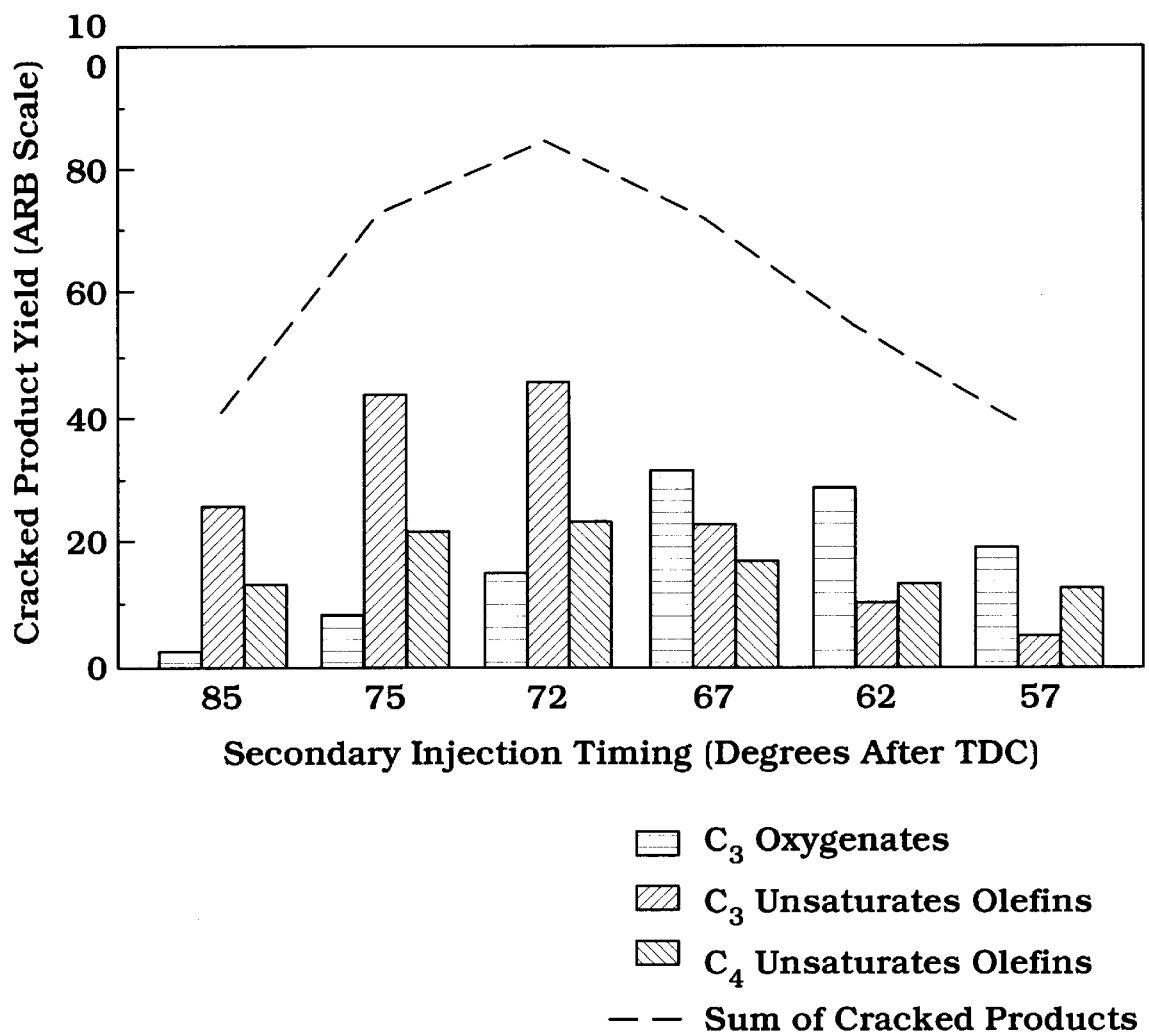
FIG. 3 shows the dependence of peak cracked product yields (oxygenates and hydrocarbon unsaturates (olefins)) on secondary injection angle as measured from the start of the expansion stroke in accordance with the present invention at a particular engine operating point, having a load of 3.1 bars BMEP, 1.4 bars inlet pressure, and a rotational speed of 2,250 RPM. Secondary injectant is a mixture of paraffins corresponding to 2 wt. % of the primary fuel charge.

Additionally, as indicated, the secondary injection angle will also be dependent upon the desired composition of the organic species in the exhaust gas stream. FIG. 3 illustrates the calculated injection products of a mixture of iso, normal, and cycloparaffin designed to represent the aliphatic portion of a typical diesel fuel (the aliphatic portion is the major portion of a typical diesel fuel) with a direct injected, 2.5 liter, 4 cylinder, turbocharged diesel engine having a compression ratio of 21:1 and operating at an indicated load ("load") of 3.1 bars Brake Mean Engine Pressure ("BMEP"), and an engine rotational speed of 2250 rpm as a function of secondary injection timing. The figure shows that the maximum production of the sum of the desired reductants, i.e. olefins and oxygenates, occurs when injecting at about 72° after top dead center. Additionally, as shown in FIG. 3, the relative amounts of oxygenates and olefins varies as secondary injection timing deviates from a 72° crank rotation angle. The data was generated using a kinetic model to simulate the performance of such an engine.

The Figure shows the production of $C_3$ oxygenates (horizontal shading), $C_3$ unsaturates (shading upwards to the right), and $C_4$ unsaturates (shading upwards to the left). Also shown is the sum of cracked products from the secondary injection (dashed line).

Figure 4:
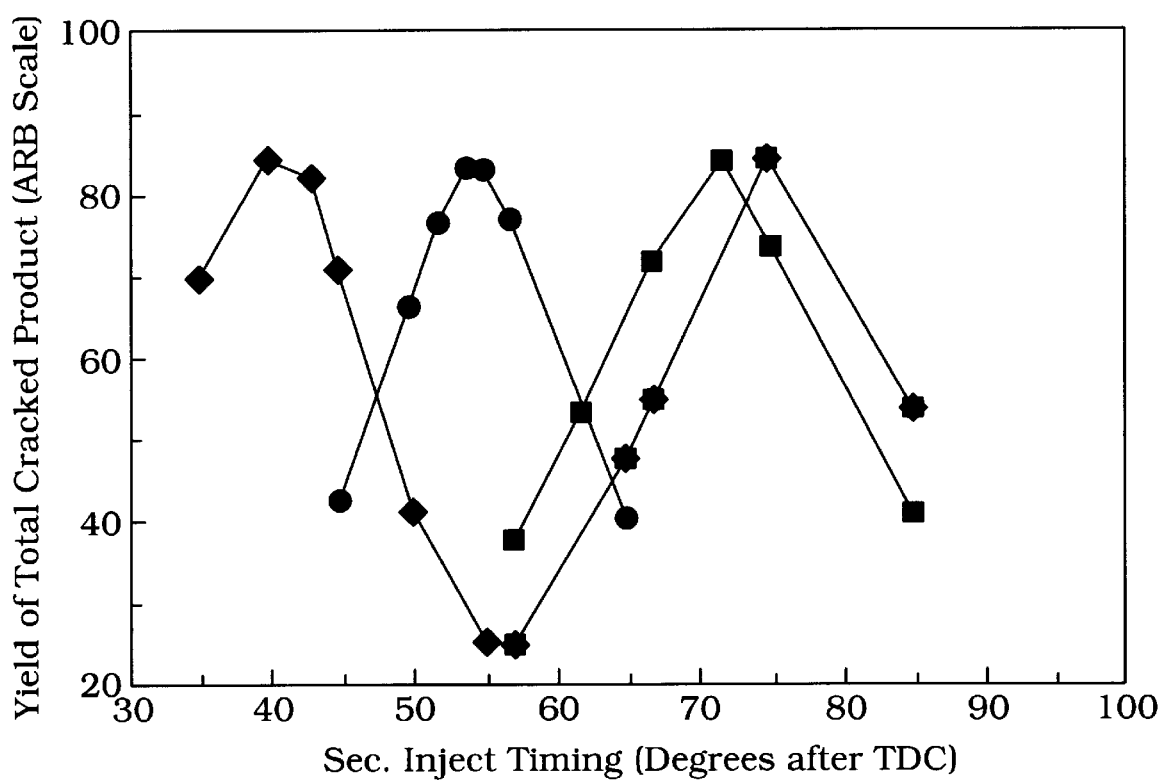
FIG. 4 is a graph showing the dependence of the sum of these cracked products on engine load, inlet pressure, and rotational speed.

In the present invention, secondary injection occurs at an angle that depends on the engine's load, inlet pressure when a compressor is present, and rotational speed. As explained above, secondary injection results in the formation of cracked products during combustion that appear in the exhaust stream. The cracked products contain oxygenates and olefins. The amount of cracked products formed and the relative amounts of olefins and oxygenates among the cracked products was found to depend on engine load, and inlet pressure, and rotational speed. FIG. 4 shows the dependence of the sum of the cracked product formation on engine load, inlet pressure, and rotational speed. Additionally, as explained above, the ratio of olefinic to oxygenate cracked products depends on engine load and rotational speed. The data of FIG. 4 was generated using the same kinetic model.

It should be noted that in cases where a compressor is used, inlet pressure may be strongly correlated with engine rotational speed.

It is well known to adapt an exhaust catalyst to a diesel engine for the purpose of reducing the concentration of $NO_x$ compounds in the engine's exhaust stream. Those skilled in the art are aware that, depending on the exhaust catalyst and exhaust conditions, oxygenates or olefins can be more reactive for $NO_x$ reduction. It is an object if the present invention to adjust the secondary injection angle so that cracked product formation is maximized as engine operating parameters are varied over the entire operating range. It is another object of the invention to adjust the secondary injection angle so that the distribution of cracked products between oxygenates and olefins is optimized as required by the exhaust catalyst and exhaust conditions for most efficient $NO_x$ conversion as operating parameters are varied over the entire operating range.

In one embodiment, a desired secondary injection angle is obtained by measuring cracked product formation and composition as a function of secondary injection angle as operating conditions such as air-fuel ratio, degree of exhaust gas recirculation, gas (air and EGR) inlet pressure when a compressor is present, engine load, and rotational speed are varied over the engine's entire operating range. These measurements are recorded as a calibration. It should be noted that all engine parameters need not be measured as part of the calibration with all engines because, as those skilled in the art are aware, some engine operating parameters may be strongly correlated depending on the configuration of the particular engine and its use. Generally, though, at least load and gas inlet pressure (when a compressor is present) must vary in determining the calibration.

During actual engine use, in accordance with this embodiment, the engine's operating conditions are measured, and the corresponding record of secondary injection angle is retrieved. The engine's injectors are then operated so that secondary injection occurs at the optimum angle through the action of an injector controller. The optimum angle, as set forth above, depends upon the quantity and ratio of oxygenates to olefins that are desired at each operating point for efficient $NO_x$ reduction and minimum exhaust hydrocarbon emission.

In a preferred embodiment, the calibration is obtained as follows:

First, the secondary injection timing angle is determined at a reference point at which $NO_x$ reductant production is maximized. This timing angle is referred to as the reference angle for peak reductant production, $AP_r$. Preferably, the reference point is selected to be well within the range of all parameters used in the calibration. Once $AP_r$ is determined, diesel engine measurements are made to determine the extent of the changes in injection angle necessary to maximize $NO_x$ reductant production as engine parameters such as load, speed, and gas inlet pressure when a compressor is present, are varied. The injection angle corresponding to maximum reductant generation is recorded for operating conditions corresponding to the operating range of the engine. The injection angle corresponding to peak reductant production (AP) at an engine operating point (i) that is different from the reference point (r) is referred to as $AP_i$. The deviation in injection angle from the reference injection angle is, therefore, $AP_i-AP_r$.

In this embodiment, the relative proportion of olefins and oxygenates present among the $NO_x$ reductants can be changed by varying secondary irnjection angle. As explained above, it is often desirable to increase the relative concentration of oxygenates or olefins among the cracked products as engine operating conditions change. Generally, a relatively greater oxygenate concentration is obtained at lower secondary injection angles and greater olefin concentration occurs at higher angles. See FIG. 3. The desired secondary injection angle at the reference operating point (r) corresponding to the desired oxygenatelolefin ratio and total cracked product yield, $AD_r$, is determined by direct engine measurements. It has been discovered that the desired deviation from the injection angle corresponding to peak reductant generation at any engine operating point (i) equal to $AD_i-AP_i$ is a constant approximately equal to the value $AD_r-AP_r$. See FIGS. 5 and 6. In other words, it has been discovered that the amount of deviation in crank angle between the secondary injection angle corresponding to peak reductant generation at any operating point (i) and the angle corresponding to the desired oxygenatelolefin ratio and total cracked product yield at the same point (i) is approximately constant for all values of (i), and consequently can be evaluated at the reference value (r).

Figure 5:
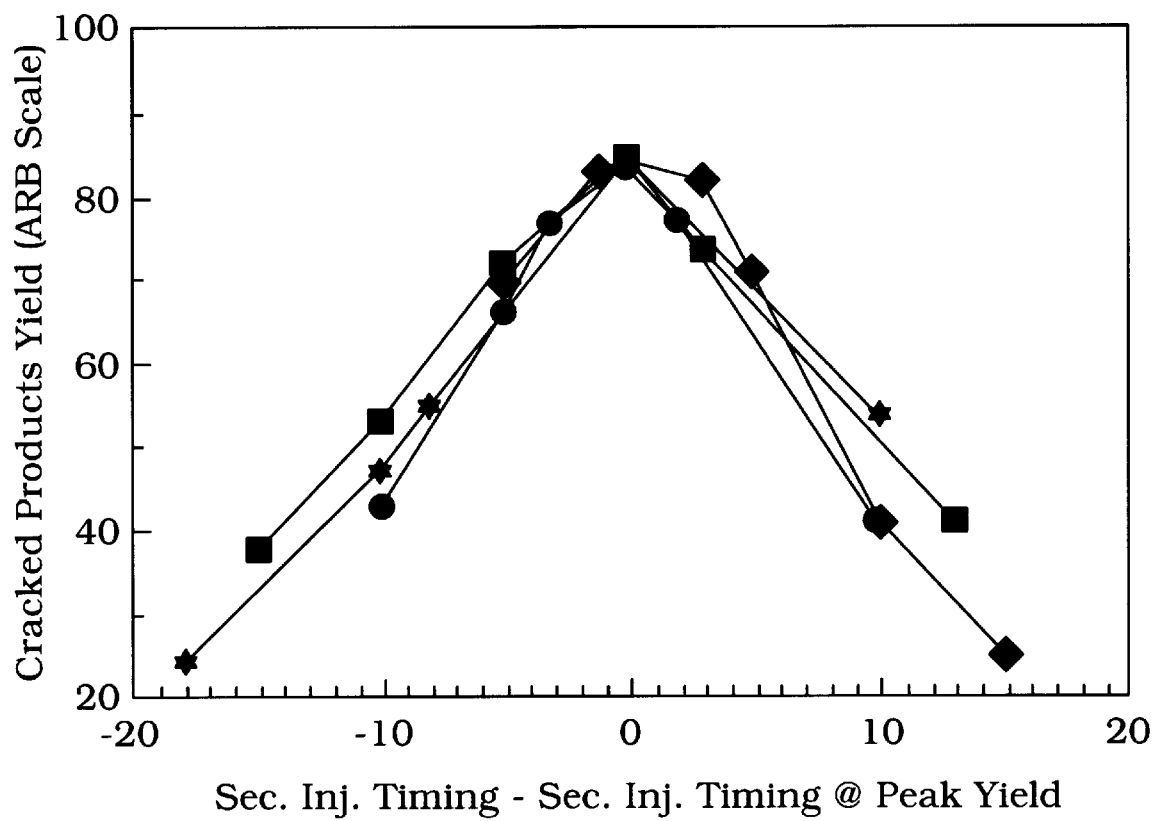
FIG. 5 shows the dependence of cracked product yield as a function of deviation from the angle at which peak yield occurs as engine operating parameters are varied.
Figure 6:
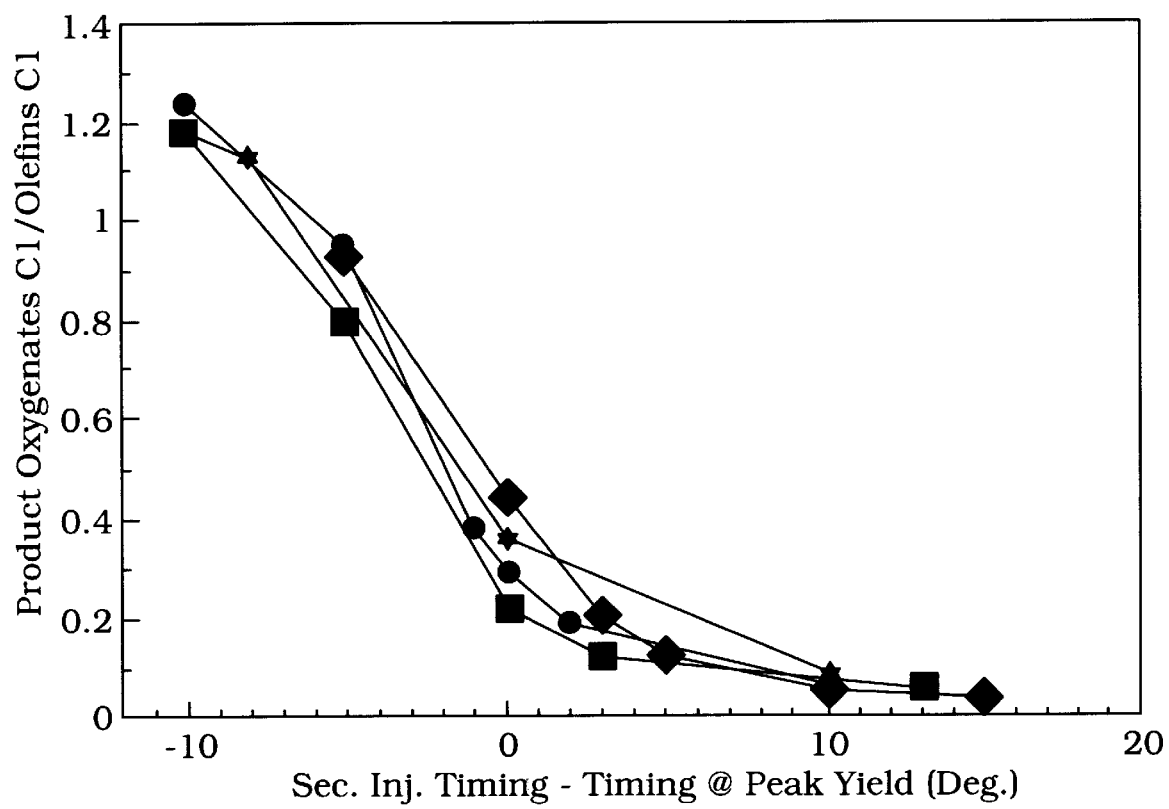
FIG. 6 shows how the ratio of $C_1$ olefins to $C_1$ oxygenates varies with the deviation in timing from the angle at which peak total yield occurs. The variation is approximately uniform as engine operating parameters vary.

In FIGS. 4 and 5, points represented by rectangles correspond to a load BMEP of 3.1 bars, 1.4 bars inlet pressure, and 2250 rpm rotational speed; diamond points correspond to 1.5 bars BMEP load, 1.4 bars inlet pressure, and 2100 rpm rotational speed; star points correspond to 3.1 bars BMEP load, 1.2 bars inlet pressure, and 1550 rpm rotational speed; and circular points correspond to 2.0 bars BMEP load, 1.1 bars inlet pressure, and 1550 rpm rotational speed. The same convention applies in FIG. 6. FIGS. 5 and 6 were generated using the same kinetic model as in FIG. 4.

To summarize, in this embodiment, the parameters $AP_r$ and $AD_r-AP_r$ and vector $AP_i$ are determined as a calibration using direct engine measurements. The amount and type of $NO_x$ reductant can be optimized later during actual engine use by determining the engine's operating point (i) that corresponds to a particular operating condition and then determining the desired crank angle for secondary injection $AD_i$ from the relationship $AD_i=AP_r+(AP_i-AP_r)+(AD_i-AP_i)$, where $AD_i-AP_i$ is equal to $AD_r-AP_r$ for any (i).

Calibration points are selected from among these values of engine load and speed that correspond to the engine's desired operating range. The particular points selected will depend on the particular catalyst employed and the total amount of $NO_x$ present in the exhaust stream before the exhaust catalyst as a function of engine load and speed.

Catalytic conversion of $NO_x$ species occurs in a temperature range where the exhaust catalyst is functional. Exhaust catalyst temperature at any particular speed is principally determined by the operating load. Consequently, at any particular speed in the operating range, the minimum load-speed calibration point is selected at a load corresponding to an exhaust catalyst temperature at the beginning of the functional range. The maximum load-speed calibration point at that speed is selected at a load corresponding to an exhaust catalyst temperature at the upper end of the catalyst's functional temperature range, provided that the load does not exceed the engine's maximum load for the selected speed.

In practice during calibration of a diesel engine, calibration points are selected at speeds spanning the desired engine operating range and maximum and minimum load values are determined for each speed as set forth above. Within the range of these maximum and minimum load values, other calibration points will be selected where increased $NO_x$ production is observed.

The exact number of calibration points will depend on both the type of diesel engine and the manner in which that engine is used. For example, in cases where an engine is operated continuously at a constant load and speed, a single calibration point may be sufficient in the practice of the invention. In other cases, such as those in which an engine is subjected to rapidly varying load and speed conditions over the entire engine operating range, calibration points may include minimum and maximum load values at representative speeds as well as calibration points within these minimum and maximum values at load-speed points corresponding to increased $NO_x$ production. The European City Emission Extended Urban Driving Cycle, is representative of such a case. This driving cycle is set forth in directive 91/441/E.E.C. as amended by 96/69/EC as the Type 1 Test, emissions test cycle.

It is not necessary to obtain a calibration value at every operating in the engine operating range that exhibits increased $NO_x$ production. A sufficient number of calibration points have been obtained when standard interpolation methods known to those skilled in the art can be used to determine the crank angle for secondary injection corresponding to peak reductant generation at any engine operating point.

Figure 2:
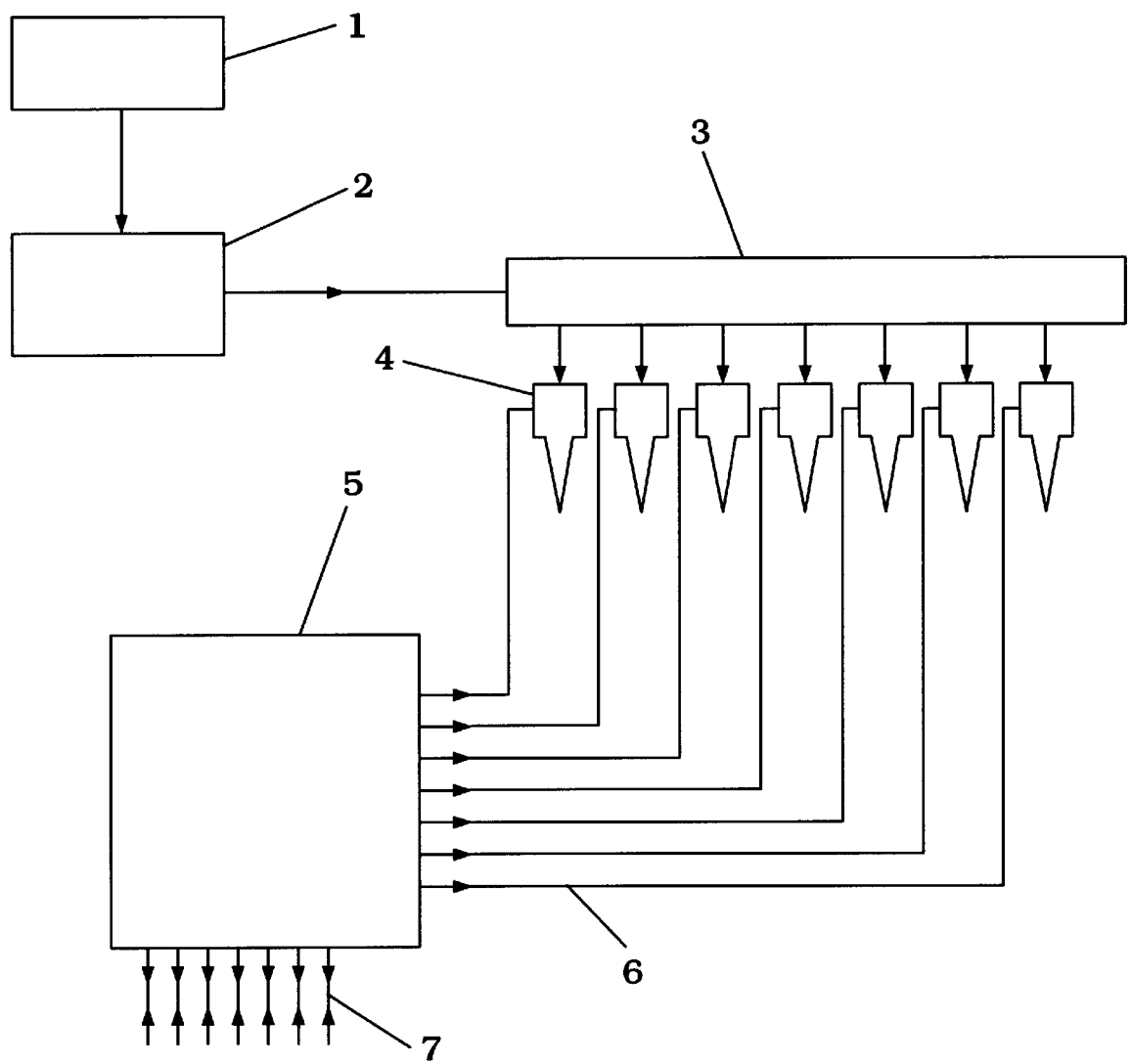
FIG. 2 is a schematic illustration a common rail injection system configured for use with the present invention.

In the preferred embodiment, the invention is implemented as shown in FIG. 2. FIG. 2 shows a fuel reservoir (1) connected to a fuel pump (2). Fuel leaves the fuel pump at a high pressure and is delivered to a common rail (3). An injector control unit (5) senses engine load and speed information via sensors (7). The injector control unit determines the engine operating point (i), and calculates the desired injection of angle $AD_i$. The injector control unit produces a signal (6) that activates the engine's injectors (4) at the appropriate crank angle so that secondary injection occurs at the desired crank angle $AD_i$ in each of the engine's cylinders.

As should be readily appreciated diesel engines come in various models. For each model engine, the relation between the condition of fuel consumption and the characteristics of the exhaust gas can be easily determined. Any person skilled in the art is capable of adjusting the exhaust gas composition by injecting preselected amount of hydrocarbon into the cylinder during its expansion power stroke at a predetermined secondary injection angle. This permits the engine to be optimized from the viewpoint of providing maximum power and efficiency and at the same time being able to have an exhaust gas which has an appropriate amount of reducing species in the gas for use in reducing the $NO_x$ in the exhaust gas in the presence of an the appropriate catalytic converter.

Secondary injection also can result in conversion of NO produced during the combustion of the primary fuel charge into $NO_2$. As in reductant generation, a desired amount of NO to $NO_2$ conversion can be obtained by varying secondary injection crank angle in response to changing engine operating conditions. The amount of conversion is affected by the degree of mixing between the NO and the injectant. Peak NO to $NO_2$ conversion at a given secondary injection crank angle and a given engine operating point is obtained when the NO and the injectant are completely mixed.

What is claimed is:

1. A method for diminishing $NO_x$ emissions by increasing the formation of oxygenates, unsaturated hydrocarbons, unsaturated oxygenates, and mixtures thereof from a hydrocarbon injected into a diesel fueled engine's cylinder during an expansion stroke following the injection of a primary fuel charge into the engine's cylinder during an intake stroke, the method comprising:

(a) determining at one or more preselected engine operating points a hydrocarbon amount and a calibration crank angle value at which an increased amount of oxygenates, unsaturated hydrocarbons, unsaturated oxygenates, and mixtures thereof are formed in the engine's cylinder, at which a diminished $NO_x$ concentration is present in the engine's exhaust stream down stream of an exhaust catalyst, and at which the engine's power is not substantially reduced;

and then during engine operation, (b) measuring the engine's operating point;

(c) determining a crank angle value and a hydrocarbon amount for injection during the expansion stroke at the measured operating point from the calibration crank angle values and hydrocarbon amounts at the preselected operating points when the measured operating point is the same as one of the preselected operating points and, when the measured operating point is different from the preselected operating points, determining the hydrocarbon amount and crank angle value for injection during the expansion stroke by interpolating between the calibration crank angle values and the calibration hydrocarbon amounts at the preselected operating points;

(d) injecting the amount of hydrocarbon into the engine's cylinder during the expansion stroke at the determined crank angle value;

(e) producing cylinder emissions of oxygenates, unsaturated hydrocarbons, unsaturated oxygenates, or mixtures thereof, useful as $NO_x$ reductants in an exhaust emissions system; and (f) repeating steps (c) and (d) whenever the operating point in step (b) changes.

2. The method of claim 1 wherein the engine's operating point is determined from at least one of engine load, engine speed, and inlet gas pressure when an inlet gas compressor is present.

3. The method of claim 1 wherein the crank angle at injection ranges from about 20° after top dead center to about 180° after top dead center.

4. The method of claim 3 wherein the amount of hydrocarbon injected during the expansion stroke ranges from about 0.5 wt. % to about 5 wt. % based on the weight of the engine's primary fuel charge.

5. The method of claim 4 wherein the injected hydrocarbon is the same as the primary fuel.

6. The method of claim 5 wherein the injected hydrocarbon is different from the primary fuel.

7. The method of claim 6 wherein the hydrocarbon injected during the expansion stroke is selected from the group consisting of iso, cyclo and normal paraffins, and mixtures thereof.

8. A method for diminishing $NO_x$ emissions by increasing the formation of oxygenates, unsaturated hydrocarbons, unsaturated oxygenates, and mixtures thereof from a hydrocarbon injected into a diesel fueled engine's cylinder during an expansion stroke following the injection of a primary fuel charge into the engine's cylinder during an intake stroke, the method comprising:

(a) determining at one or more preselected operating points a calibration hydrocarbon amount ranging from about 0.5% to about 5 wt. % based on the weight of the engine's primary fuel charge, the hydrocarbon being the same as the primary fuel and a calibration crank angle ranging from about 20° after top dead center to about 180° after top dead center value at which an increased amount of oxygenates, unsaturated hydrocarbons, unsaturated oxygenates, and mixtures thereof are formed in the engine's cylinder, at which a diminished $NO_x$ concentration is present in the engine's exhaust stream downstream of an exhaust catalyst, and at which the engine's power is not substantially reduced;

and then during engine operation (b) measuring the engine's operating point;

(c) determining a crank angle value and a hydrocarbon amount for injection during the expansion stroke at the measured operating point from the calibration crank angle values and calibration hydrocarbon amounts at the preselected operating points when the measured operating point is the same as one of the preselected operating points and, when the measured operating point is different from the preselected operating points, determining the hydrocarbon amount and crank angle value for injection during the expansion stroke by interpolating between the calibration crank angle values and the calibration hydrocarbon amounts at the preselected operating points;

(d) injecting the amount of hydrocarbon into the engine's cylinder during the expansion stroke at the crank angle value;

(e) producing cylinder emissions of oxygenates, unsaturated hydrocarbons, unsaturated oxygenates, or mixtures thereof, useful as $NO_x$ reductants in an exhaust emissions system, and (f) repeating steps (c) and (d) whenever the operating point in step (b) changes.

* * * * *